United States Patent
Maeda

(10) Patent No.: US 9,363,465 B2
(45) Date of Patent: Jun. 7, 2016

(54) DATA PROCESSING APPARATUS AND DATA PROCESSING METHOD

(71) Applicant: CANON KABUSHIKI KAISHA, Tokyo (JP)

(72) Inventor: Masamine Maeda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 14/568,291

(22) Filed: Dec. 12, 2014

(65) Prior Publication Data
US 2015/0172502 A1    Jun. 18, 2015

(30) Foreign Application Priority Data
Dec. 18, 2013  (JP) .................................. 2013-261842

(51) Int. Cl.
| | |
|---|---|
| H04N 9/80 | (2006.01) |
| H04N 5/77 | (2006.01) |
| H04N 5/907 | (2006.01) |
| H04N 9/804 | (2006.01) |

(52) U.S. Cl.
CPC ............... *H04N 5/907* (2013.01); *H04N 5/772* (2013.01); *H04N 9/8042* (2013.01)

(58) Field of Classification Search
USPC ........................................ 386/223–226, 248
See application file for complete search history.

(56) References Cited

U.S. PATENT DOCUMENTS

| | | | |
|---|---|---|---|
| 7,079,172 B2 * | 7/2006 | Izumiya ................. | H04N 1/053 347/249 |
| 2010/0110291 A1 * | 5/2010 | Owashi .................. | H04N 5/073 348/529 |

FOREIGN PATENT DOCUMENTS

JP       2011-134009 A       7/2011

\* cited by examiner

*Primary Examiner* — Nigar Chowdhury
(74) *Attorney, Agent, or Firm* — Cowan, Liebowitz & Latman, P.C.

(57) ABSTRACT

A data processing apparatus which transmits a clock signal to a recording medium, transmits a command to the recording medium and receives data output from the recording medium in response to a timing signal obtained by delaying the clock signal. The apparatus transmits to the recording medium a transmission command in a predetermined data string including a predetermined pattern and receive the predetermined data output from the recording medium. The apparatus adjusts a delay amount of the timing signal based on a reception result of the predetermined data string in a first mode or second mode. The reception result is based on timing signals each including a delay amount, in a first range in the first mode and in a second range narrower than the first range in the second mode.

11 Claims, 6 Drawing Sheets

DATA PROCESSING APPARATUS AND DATA PROCESSING METHOD

BACKGROUND OF THE INVENTION

1. Field of the Invention

The present invention relates to a data processing apparatus and a data processing method.

2. Description of the Related Art

Conventionally, when data is read from a memory card such as an SD card, the delay amount of data transmission from the card relative to a clock given by a host to the card has been a standardized fixed value. A host side can therefore receive data from the card successfully and access the card without any problems by latching the data transmitted from the card at a timing delayed relative to the clock transmitted from the card by a predetermined amount.

Recently, however, the aforementioned delay amount cannot be defined by the fixed value because the speed of the clock for data transmission/reception between the memory card and the host increases along with an increase in the access speed of the memory card. For this reason, UHS-1 (Ultra High Speed-1) as the high-speed standard of the SD memory card defines that a data latch timing adjustment is necessary when using a clock of a predetermined frequency. This latch timing adjustment operation is referred to as tuning (see Japanese Patent Laid-Open No. 2011-134009).

However, the delay amount of the clock for latching data varies according to external factors such as a card temperature. Therefore, if card access is repeated for many hours, for example, when writing data in the card successively, the delay amount changes along with a change in the card temperature, resulting in a failure in data read/write. In this case, it is considered to perform tuning processing again. However, since data cannot be read/written from/in the card while tuning, tuning more than necessary leads to a decrease in a transfer rate.

SUMMARY OF THE INVENTION

The present invention has been made in consideration of the above-described problems, and secures access reliability while preventing a decrease in a data transfer rate onto a recording medium even under a use condition that a delay amount changes.

One aspect of embodiments of the present invention relates to a data processing apparatus comprising, a transmission unit configured to transmit a clock signal to a recording medium, a communication unit configured to transmit a command to the recording medium and receive data output from the recording medium in response to a timing signal obtained by delaying the clock signal, and a control unit configured to control the communication unit to transmit a transmission command for requesting the recording medium to transmit a predetermined data string having a predetermined pattern and receive the predetermined data string output from the recording medium, and wherein the control unit performs an adjustment process for adjusting a delay amount of the timing signal based on a result that the communication unit has received the predetermined data string, and the control unit has a plurality of modes including a first mode in which the delay amount of the timing signal is adjusted based on a result that the communication unit has received the predetermined data string in response to a plurality of timing signals each has a delay amount in a first range and a second mode in which the delay amount of the timing signal is adjusted based on a result that the communication has received the predetermined data string in response to a plurality of timing signals each has a delay amount in a second range narrower than the first range.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An illustrative embodiment of the present invention will be described below in detail with reference to the accompanying drawings. Note that in the embodiment to be described below, an example in which the present invention applies to a digital camera capable of writing/reading data in/from a connected memory card as an example of a recording/reproduction apparatus will be described. The present invention, however, can apply to an arbitrary equipment (host apparatus) capable of writing/reading data in/from a recording medium. The equipment is not limited to the digital camera, but also includes, for example, a personal computer, a portable phone, a smartphone, a PDA, or a digital video camera.

Figure 1:
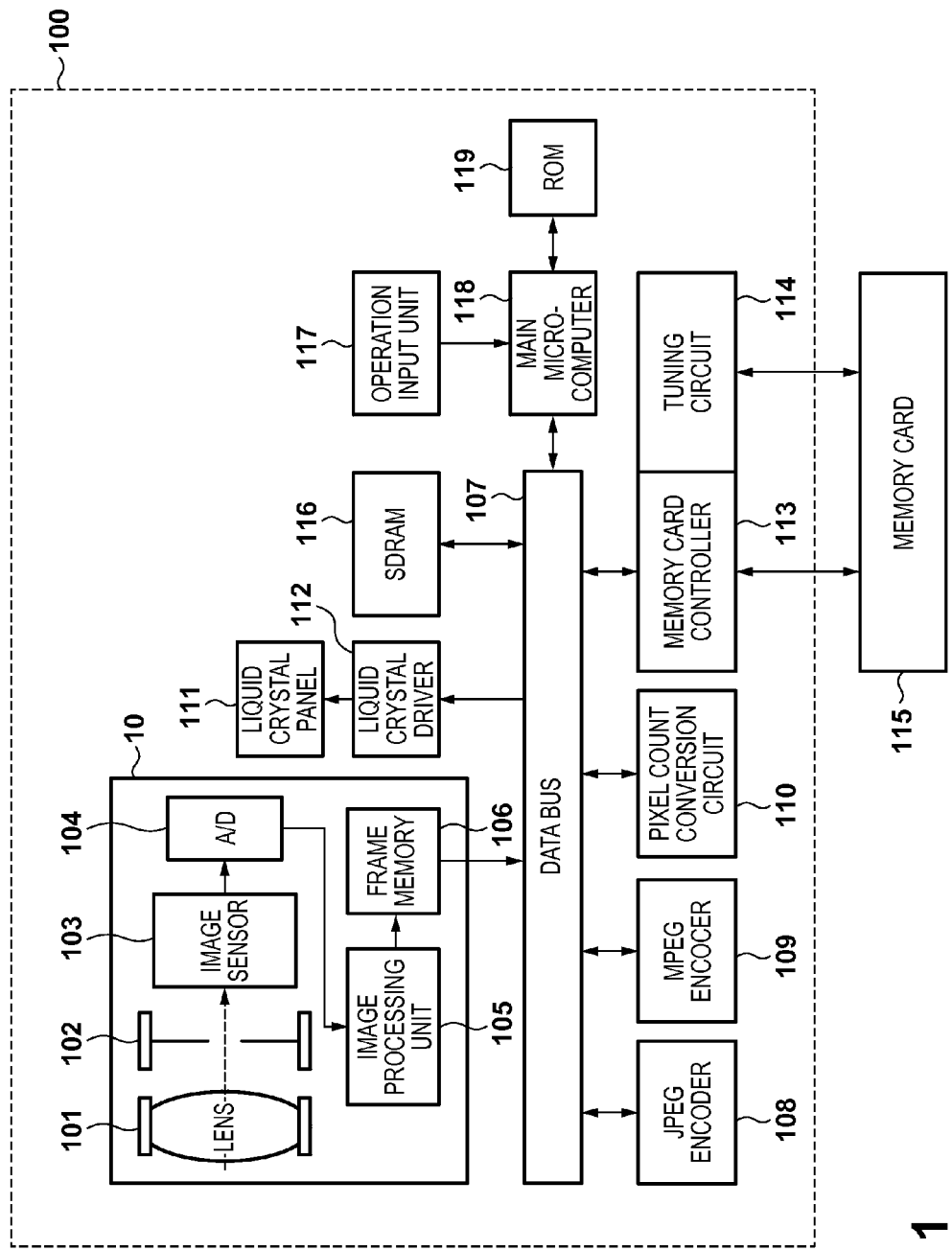
FIG. 1 is a block diagram showing an example of the functional arrangement of a digital camera 100 according to an embodiment of the present invention.

FIG. 1 is a block diagram showing an example of the arrangement of a digital camera according to this embodiment. A main microcomputer 118 is, for example, a CPU. The main microcomputer 118 controls the operation of each block included in a digital camera 100. More specifically, the main microcomputer 118 controls the operation of each block by reading a program stored in a ROM 119 for causing each block to perform various sequences to be described later and loading the program to a SDRAM 116 to execute. The main microcomputer 118 also controls a liquid crystal driver 112 to be described later to perform display control of a liquid crystal panel 111.

The ROM 119 is, for example, a nonvolatile memory capable of electrically erasing/recording data. The ROM 119 stores not only the operation program of each block included in the digital camera 100 but also information such as a constant needed in the operation of each block.

A photographing lens 101 captures an object image and forms the object image on an image sensor 103 after restricting a light amount to a predetermined amount by a stop 102. The image sensor 103 is, for example, a CCD sensor or a CMOS sensor, and photoelectrically converts the object image formed on an imaging plane and outputs an analog image signal. The main microcomputer 118 restricts the light amount of the object image formed by the photographing lens 101 by controlling the opening amount of the stop 102. The analog image signal output from the image sensor 103 undergoes A/D conversion processing by an A/D converter 104 and is converted into a digital image data. The obtained image data undergoes processes related to gamma correction, white balance correction, and noise reduction in an image processing unit 105, and is then stored in a frame memory 106 as non-compressed image data. The photographing lens 101, the stop 102, the image sensor 103, the A/D converter 104, the image processing unit 105, and the frame memory 106 form an image generation unit (imaging unit) 10 of the digital camera 100 according to this embodiment.

In the following embodiment, a case in which the image data generated in the image generation unit is written in a memory card 115 serving as a recording medium or a case in which the written image data is read from the memory card 115 will be described. However, a target to which the present invention is applicable is not limited to the image data, and may be audio data or multimedia data including moving image data and audio data. These kinds of data can generally be referred to as information data. The recording/reproduction apparatus as the embodiment of the present invention can further include, in order to generate the information data, an audio generation unit including a microphone, an A/D converter, and an audio processing unit in addition to the image generation unit 10.

A JPEG encoder 108 compression-codes the non-compressed image data in accordance with an encoding format (JPEG format) for a still image recorded by the digital camera 100 according to this embodiment, thereby generating JPEG still image data. On the other hand, an MPEG encoder 109 compression-codes the non-compressed image data as a frame in accordance with an encoding format (MPEG format) for a moving image recorded by the digital camera 100 according to this embodiment, thereby generating MPEG moving image data. Various data generated by the JPEG encoder 108 and the MPEG encoder 109 are temporarily written in the SDRAM 116 via a data bus 107. The SDRAM 116 is a volatile memory. The SDRAM 116 stores, in addition to the data generated by the JPEG encoder 108 and the MPEG encoder 109, image data converted to be displayed on the liquid crystal panel 111. The SDRAM 116 is also used as a buffer memory space for reading data in accordance with a write status in data write in the memory card 115 and arbitrating a recording speed between itself and the memory card 115. Furthermore, the SDRAM 116 provides a working memory space of a pixel count conversion circuit 110 where a thumbnail image to be used for index-display at the time of reproduction is generated from a shot image.

The liquid crystal panel 111 is a display device such as an LCD included in the digital camera 100. As described above, the main microcomputer 118 performs the display control of the liquid crystal panel 111. More specifically, the liquid crystal driver 112 which has received an instruction from the main microcomputer 118 converts a display image data stored in the SDRAM 116 into a liquid crystal display signal and outputs it to the liquid crystal panel 111, thereby performing the display control. The liquid crystal panel 111 also functions as an electronic viewfinder by converting, using the pixel count conversion circuit 110, the non-compressed image data changed to have the number of pixels to be displayed on the liquid crystal panel 111 into the liquid crystal display signal and inputting it (live view display).

The memory card 115 is a recording medium capable of writing/reading data by being detachably connected to the digital camera 100. In this embodiment, the memory card 115 is a memory card formed by a NAND flash memory and a controller. In the memory card 115, data is managed in a format complying with a PC-compatible FAT (File Allocation Table) file system. The memory card 115 is connected to the digital camera 100 via a card slot (not shown). The card slot may include a card detection switch, and can output a detection signal to the main microcomputer 118 when detecting that the memory card 115 is inserted into the card slot.

The memory card controller 113 performs communication such as data write in the memory card 115 and data read from the memory card 115. The memory card controller 113 reads recording data from the SDRAM 116 at the time of data write and writes the read data in the memory card 115. Furthermore, the memory card controller 113 reads data from the memory card 115 at the time of data read and stores the read data in the SDRAM 116.

The tuning circuit 114 operates in cooperation with the memory card controller 113, and adjusts a reception timing, relative to the card clock, for receiving a response from the memory card with respect to a command to the memory card and a reception timing, relative to the card clock, for receiving data from the memory card.

An operation input unit 117 is a user interface which may be any variety of switch which accepts various operations from a user. The operation input unit 117 includes a shutter button which performs a still image shooting operation, a trigger button which instructs the start/end of shooting the moving image, and a mode switch which switches the shooting mode and the reproduction mode of the camera. When the user operates various operation keys provided in the digital camera 100, the operation input unit 117 receives a signal according to the operation and outputs a control signal corresponding to the operation to the main microcomputer 118.

Figure 2:
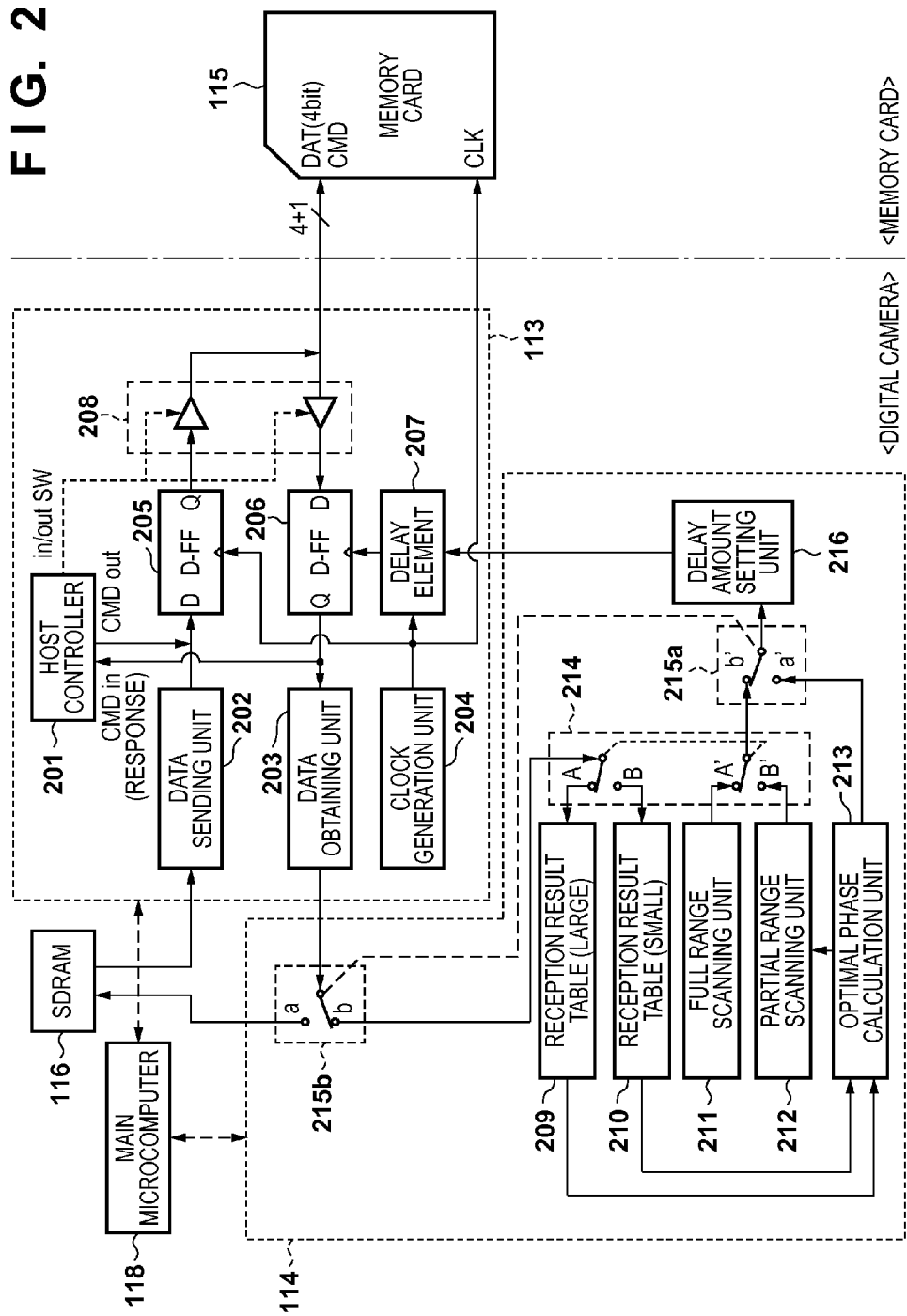
FIG. 2 is a block diagram showing an example of the internal arrangements of a memory card controller 113 and a tuning circuit 114 according to the embodiment of the present invention.

The detailed arrangements of the memory card controller 113 and the tuning circuit 114 according to this embodiment will now be described. FIG. 2 is a block diagram showing an example of the functional arrangements of the memory card controller 113 and the tuning circuit 114 in FIG. 1. In FIG. 2, the dotted frame 113 indicates the memory card controller 113, and the dotted line 114 indicates the tuning circuit 114. Each of the memory card 115, the SDRAM 116, and the main microcomputer 118 also indicates the same block as in FIG. 1.

First, the detailed arrangement of the memory card controller 113 will be described. The memory card controller 113 transmits/receives a signal and data via a CLK line, a CMD line, and a DAT line when writing/reading data in/from the memory card 115.

A host controller 201 performs, via the CMD line, the output of a command signal related to data read/write and the reception of a response signal of the command output to the memory card 115. The host controller 201 also performs control of transmitting/receiving, via the DAT line, data to be written in the memory card 115 or data read from the memory card 115. More specifically, the host controller 201 issues a command of controlling the operation of the memory card 115 and receives the command response from the memory card 115 by an instruction from the main microcomputer 118.

A data sending unit 202 sends the recording data (the JPEG still image data and the MPEG moving image data) from the SDRAM 116 to the memory card 115.

A data obtaining unit 203 receives test data from the memory card 115 at the time of a tuning operation to be described later and data recorded in the memory card 115, and outputs the received data to a switch 215b.

A clock generation unit 204 generates a clock signal (CLK signal) which is used for controlling read and write timing and is formed by a clock pulse. The clock generation unit 204 outputs the generated clock signal via the CLK line. The clock signal gives the memory card 115 data timings of writing data from the host (digital camera 100) to the card and reading data from the card to the host. At the same time, the clock signal gives the host controller 201 timings of sending/receiving data.

A D flip-flop 205 on a transmitting side latches data output from the host controller 201 and the data sending unit 202, synchronizes them with the timing of the clock signal from the clock generation unit 204, and then sends them to the memory card 115. A D flip-flop 206 on a receiving side latches the data from the memory card 115 in response to a timing signal from a delay element 207 to be described later. The delay element 207 delays the phase of the clock signal from the clock generation unit 204 in accordance with control from the main microcomputer 118, and generates a timing signal for latching data output from the memory card 115 at the time of reading data from the memory card 115. Note that a signal branch unit 208 performs, in accordance with control of the host controller 201, switching between the CMD line and the DAT line in response to command input/output and data transmission/reception.

The detailed arrangement of the tuning circuit 114 will now be described. The tuning circuit 114 is a circuit for performing determination processing of determining the delay amount in the delay element 207 in accordance with the reception result of the test data received from the memory card 115.

Figure 4:
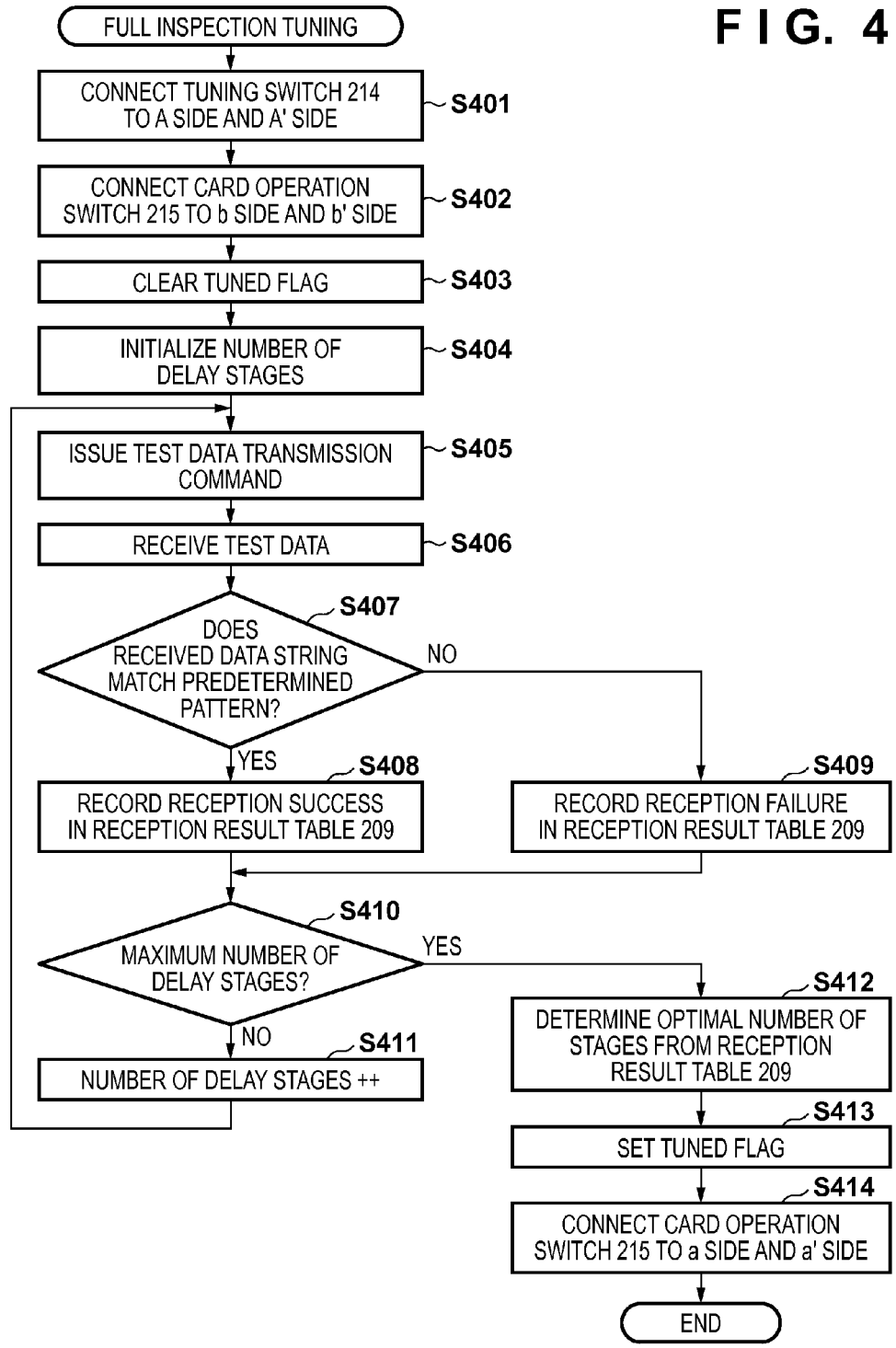
FIG. 4 is a flowchart showing an example of the processing of the full inspection tuning done by the digital camera 100 according to the embodiment of the present invention.

A reception result table (large) 209 is the first table representing the reception enable/disable result created in full inspection tuning processing to be described later with reference to a flowchart in FIG. 4. A reception result table (small) 210 is the second table representing the reception enable/disable result created in partial inspection tuning processing to be described later with reference to a flowchart in FIG. 5. Each of these reception result tables 209 and 210 is stored in a register (not shown) and read as needed. A full range scanning unit 211 defines the minimum value and the maximum value of the number of delay stages in the operation of the flowchart of FIG. 4 to be described later and changes the number of delay stages at the time of a full inspection tuning operation. A partial range scanning unit 212 defines the minimum value and the maximum value of the number of delay stages in the operation of the flowchart of FIG. 5 to be described later and changes the number of delay stages at the time of a partial inspection tuning operation.

An optimal phase calculation unit 213 determines, from the reception result table (large) 209 or the reception result table (small) 210, the optimal value of the number of delay stages used when receiving the data or the command from the memory card 115. A tuning switch 214 is a switch for selecting a signal path in accordance with a type of tuning processing to be executed. The switch 214 connects to an A side and an A' side synchronously at the time of the full inspection tuning processing, and connects to a B side and a B' side synchronously at the time of the partial inspection tuning processing. Card operation switches 215a and 215b are switches each selecting the signal path in accordance with the operation state of the memory card 115. The switches 215a and 215b connect to an a side and an a' side synchronously at the time of the data access of the memory card 115, and connect to a b side and a b' side synchronously at the time of tuning execution. A delay amount setting unit 216 sets the number of delay stages as a set delay amount in the delay element 207.

An overview of tuning processing in the digital camera according to this embodiment having the above arrangement will now be described. When the memory card controller 113 transmits a "test data transmission command" as a test data output instruction to the memory card 115, the memory card 115 transmits a 64-byte data string having a predetermined pattern in synchronization with a clock signal sent from the clock generation unit 204 to the memory card 115. The memory card controller 113 receives the data string in response to a latch timing signal supplied from the clock generation unit 204. Note that the latch timing signal can change its phase relationship with the clock signal (CLK) by changing the value of the number of delay stages set in the delay element 207.

Figure 3:
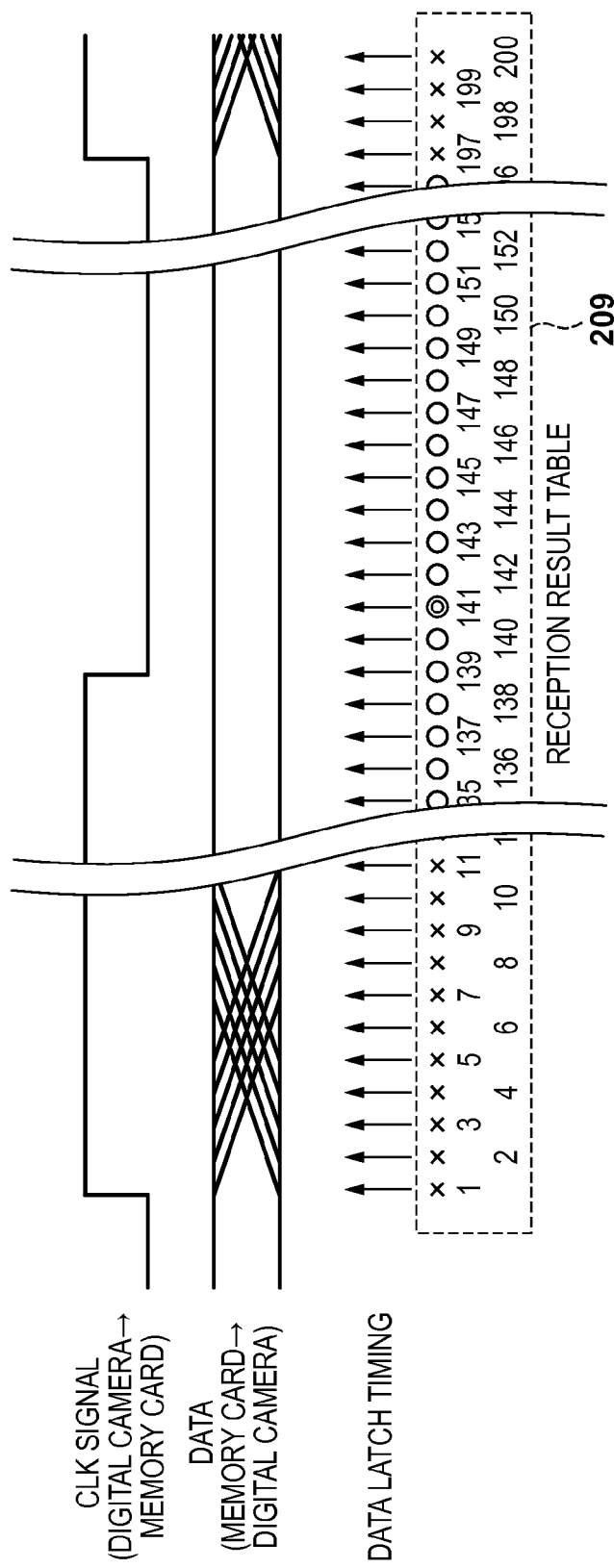
FIG. 3 is a view for explaining the operation of full inspection tuning done by the digital camera 100 according to the embodiment of the present invention.

In this embodiment, assume that the delay amount per stage in the delay element 207 is a predetermined time shorter than one cycle of the clock signal. In this embodiment, the delay amount per stage in the delay element 207 is determined based on, for example, a period (inversion period) required to invert the response data from the memory card 115 between high level (logic 1) and low level (logic 0). In this embodiment, the delay amount per stage in the delay element 207 is determined to be a period sufficiently shorter than the inversion period (for example, about a range of a fraction of several tens to a fraction of several hundreds). However, the delay amount can be a period shorter than this. As described above, the delay amount of each delay element may vary owing to a temperature characteristic or the like. The length of the inversion period is defined by, for example, a standard for writing/reading data in/from the memory card 115. In this embodiment, as shown in FIG. 3, the number of delay stages in the delay element 207 can be set to cover a timing width larger than one cycle of the card clock.

The full inspection tuning processing as the adjustment process of the number of delay stages performed in the digital camera 100 according to this embodiment having the above-described arrangement will be described in detail below with reference to the flowchart in FIG. 4. Note that while this tuning processing is in progress, the main microcomputer 118 need not perform recording processing even if the start instruction of the recording processing is made. Furthermore, in the full inspection tuning processing, the main microcomputer 118 controls the memory card controller 113 and the tuning circuit 114 to cause each block to perform a corresponding process. Therefore, a description will be made assuming that the main microcomputer 118 can refer to data or the like obtained in processes in the memory card controller 113 and the tuning circuit 114.

The main microcomputer 118 stores an upper-layer program and a driver program. The upper-layer program performs, on the driver program, an instruction to perform card mounting, instructions to start moving image recording, execute card write during moving image recording, end moving image recording, execute card write at the time of still-image shooting, and read a card at the time of reproduction, and the like. Upon receiving the above-described instructions, the driver program issues a command to the memory card 115 via the host controller 201, thereby controlling its operation.

First, the upper-layer program instructs the full inspection tuning operation. After that, control is performed by the driver program. The main microcomputer 118 causes the clock generation unit 204 in the memory card controller 113 to start clock signal transmission. In step S401, the main microcomputer 118 connects the tuning switch 214 to the A side and the A' side. In subsequent step S402, the main microcomputer 118 connects the card operation switch 215a to the b side and the card operation switch 215b to the b' side, respectively. In subsequent step S403, the main microcomputer 118 clears a tuned flag held within the SDRAM 116. Furthermore, in step S404, the main microcomputer 118 initializes (sets to "1") the number of delay stages of the clock signal in the delay element 207 via the full range scanning unit 211.

In step S405, the host controller 201 issues, to the memory card 115, the test data transmission command for controlling the memory card 115 to transmit the test data and transmits the command via the CMD line. Assume that the test data is the 64-byte data string having the predetermined pattern, and transmitted by the memory card 115 in synchronization with the clock signal transmitted to the memory card 115. Next, in step S406, the main microcomputer 118 receives the 64-byte test data from the memory card 115 via the host controller 201. At this time, the flip-flop 206 latches data received from the memory card 115 via the DAT line in response to the timing signal supplied from the delay element 207, and supplies the latched data to the host controller 201. The delay element 207 delays the clock signal in accordance with the number of delay stages set currently, thereby generating the timing signal to be supplied from the delay element 207. The SDRAM 116 stores the received data.

In subsequent step S407, the main microcomputer 118 determines whether the data string stored in the SDRAM 116 (the pattern obtained by latching, by the flip-flop 206, the test data string transmitted from the memory card 115) matches a predetermined pattern of the test data. If the main microcomputer 118 determines that all the 64 bytes of the received data string match the predetermined pattern, the process shifts to step S408. If the main microcomputer 118 determines that at least part of the received data string does not match the predetermined pattern, the process shifts to step S409. In step S408, the main microcomputer 118 records reception success information in association with the current number of delay stages in the reception result table (large) 209. An example of the reception result table (large) 209 is as shown in FIG. 3. The reception result table (large) 209 is a table showing the test data reception enable/disable result corresponding to the number of delay stages. In FIG. 3, ○ indicates a reception success and x indicates a reception failure. On the other hand, in step S409, the main microcomputer 118 records reception failure information in association with the current number of delay stages in the reception result table (large) 209.

Then, in step S410, the main microcomputer 118 determines whether the number of delay stages set in the delay element 207 is the maximum number of delay stages. If the number of delay stages set in the delay element 207 is not the maximum number of delay stages, in step S411, the full range scanning unit 211 sets the next larger number of delay stages in the delay element 207 via the delay amount setting unit 216 according to an instruction from the main microcomputer 118, and then the process returns to step S405. On the other hand, if the main microcomputer 118 determines that the number of delay stages set in the delay element 207 is the maximum number of delay stages, the reception result table (large) 209 is completed, thus shifting the process to step S412.

In step S412, according to an instruction from the main microcomputer 118, the optimal phase calculation unit 213 determines the optimal number of delay stages that should be set in the delay element 207 at the time of access to the memory card 115 with reference to the reception result table (large) 209. The determined optimal number of delay stages will be set in the delay element 207 later as the set delay amount. More specifically, with the process above, the full range scanning unit 211 sets the delay amount of the clock signal in the delay element 207 stepwise. Based on the reception result in each delay amount, the reception result table (large) 209 as shown in, for example, FIG. 3 is obtained. Accordingly, the optimal phase calculation unit 213 can determine, as the optimal number of delay stages, the central value in the group (range) of the number of delay stages that has succeeded in reception in step S412. In the example of FIG. 3, out of the group of the number (phase) of delay stages that has succeeded in reception, 141 which is the median value in the group is determined as the optimal number of delay stages.

Then, in step S413, the main microcomputer 118 sets the tuned flag indicating that the optimal number of stages has been calculated in the SDRAM 116. In subsequent step S414, the main microcomputer 118 connects the card operation switch 215 to the a side and the a' side. This makes it possible to supply the optimal number of stages determined by the optimal phase calculation unit 213 to the delay amount setting unit 216 and set the optimal number of stages in the delay element 207. The data read from the memory card 115 is output from the data obtaining unit 203 to the SDRAM 116. That concludes a series of processes.

Figure 5:
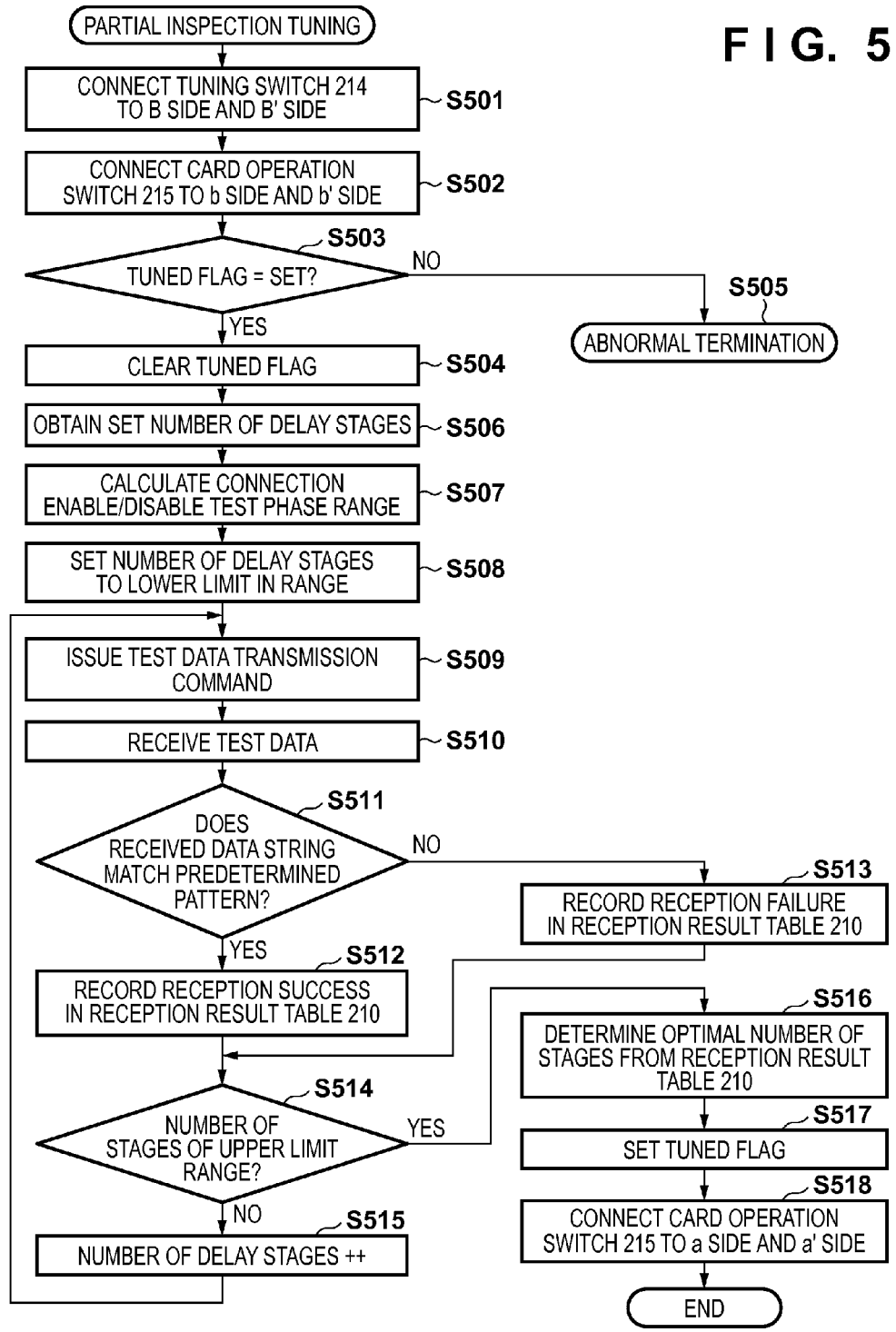
FIG. 5 is a flowchart showing an example of the processing of partial inspection tuning done by the digital camera 100 according to the embodiment of the present invention.

The partial inspection tuning processing performed in the digital camera 100 according to this embodiment will now be described in detail with reference to the flowchart in FIG. 5. In the partial inspection tuning, tuning is performed again on a range (inspection range) having a predetermined number of delay stages centered on the optimal number of stages determined in the full inspection tuning, thereby setting the optimal number of stages in again accordance with a deviation between the clock and the data. Note that the inspection range in the partial inspection tuning is set to cover a data transition period (data invalid period) defined at the time of design, in other words, to be a range larger than that period.

When the upper-layer program in the main microcomputer 118 instructs the partial inspection tuning operation, after that, control is performed by the driver program. In step S501, the main microcomputer 118 connects the tuning switch to the B side and the B' side. In subsequent step S502, the main microcomputer 118 connects the card operation switch 215 to the b side and the b' side. Next, in step S503, the main microcomputer 118 determines whether the flag is set with reference to the value of the tuned flag in the SDRAM 116. If the main microcomputer 118 determines that the flag is set, the process shifts to step S504. On the other hand, if the main microcomputer 118 determines that no flag is set, the optimal number of stages at the time of the last tuning is unknown, resulting in abnormal termination in step S505. Note that in this case, the full inspection tuning is conducted in accordance with an instruction from the upper-layer program. After it is confirmed that the tuned flag is set in step S503, the main microcomputer 118 clears the tuned flag in step S504.

In subsequent step S506, the main microcomputer 118 obtains the optimal number of stages calculated in the full inspection tuning from the SDRAM 116. Next, in step S507, the main microcomputer 118 calculates the range of the number of delay stages inspected in the partial inspection tuning. If the optimal number of stages obtained from the SDRAM 116 is, for example, 141, a predetermined number of stages in the neighborhood of 141 as the center can be set as the inspection range. Assuming that the predetermined number of stages is, for example, 50, it is possible to cover the data transition period with 101 stages in total and inspect whether reception is made in the inspection range of 91 to 191 stages. Then, in step S508, the partial range scanning unit 212 sets, in accordance with an instruction from the main microcomputer 118, the number of delay stages of the delay amount setting unit 216 to the lower limit number of stages in the inspection range. In the above-described example, the number of delay stages can be set to "91".

The processes from subsequent steps S509 to S511 are the same as the processes from steps S405 to S407. If the received test data matches a predetermined pattern data in step S511, the main microcomputer 118 records reception success information in association with the current number of delay stages in the reception result table (small) 210 in step S512. On the other hand, if the received test data does not match the predetermined pattern data, the main microcomputer 118 records reception failure information in association with the current number of delay stages in the reception result table (small) 210 in step S513. Note that the reception result table (small) 210 is a table in which only the reception result of the test data in the inspection range of the number of delay stages is recorded, and stored in the SDRAM 116. Then, in step S514, the main microcomputer 118 determines whether the number of delay stages reaches the upper limit number of stages in the inspection range. In the above-described example, this upper limit number of stages can be set to 191 stages. If the number of delay stages is not an upper limit value, the partial range scanning unit 212 increases the number of delay stages by one in accordance with an instruction from the main microcomputer 118 in step S515, and the process from step S509 is repeated. On the other hand, if the number of delay stages is the maximum value, the reception result table (small) 210 is completed, thus shifting the process to step S516. In step S516, according to an instruction from the main microcomputer 118, the optimal phase calculation unit 213 determines the new optimal number of stages with reference to the reception result table (small) 210. Details of this determination operation will be described later with reference to FIGS. 6A and 6B. Then, in step S517, the main microcomputer 118 sets the tuned flag in the SDRAM 116. In subsequent step S518, the main microcomputer 118 connects the card operation switch 215 to the a side and the a' side. This makes it possible to supply the new optimal number of stages calculated by the optimal phase calculation unit 213 to the delay amount setting unit 216 and set the optimal number of stages in the delay element 207 again. That concludes a series of processes.

Figure 6A:
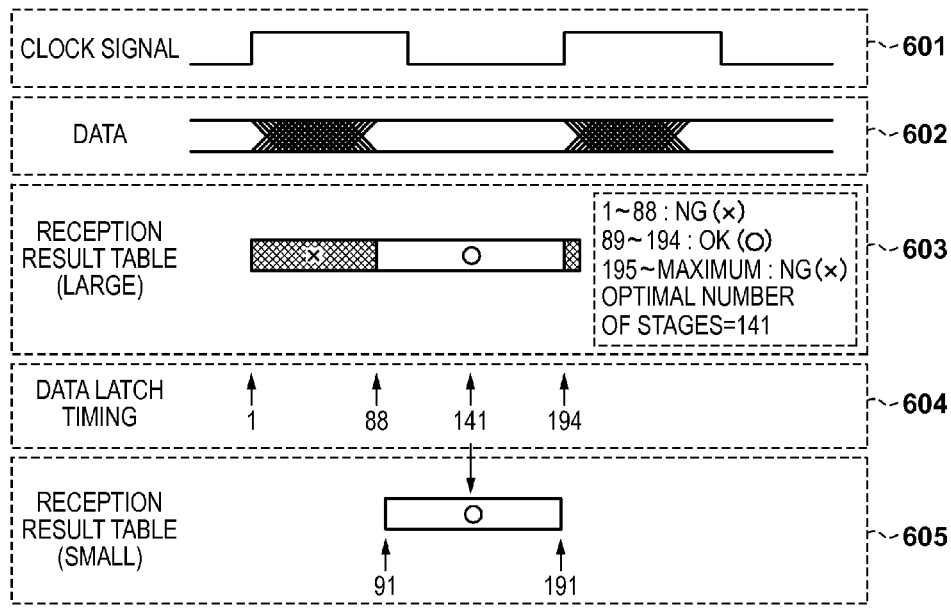
FIGS. 6A and 6B are views for explaining the tuning operations done by the digital camera 100 according to the embodiment of the present invention in contrast with one another.
Figure 6B:
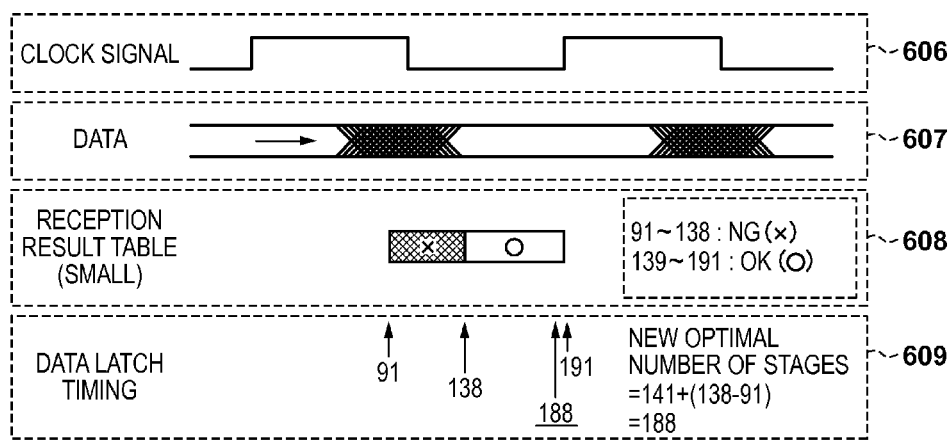

A concrete example of the partial inspection tuning conducted after the full inspection tuning will now be described with reference to FIGS. 6A and 6B. FIGS. 6A and 6B are views showing a relationship between the full inspection tuning and the partial inspection tuning. FIG. 6A is the view showing an example in which the partial inspection tuning is performed after performing the full inspection tuning and before changing a data output timing. In FIG. 6A, a reception result 603 in the reception result table (large) 209 is a result that the full inspection tuning is performed by receiving a test data waveform 602 output from the memory card 115 at a latch timing 604 generated by using a clock signal 601 from the clock signal generation unit 204. The contents in the reception result table (large) 209 represent the reception results at the latch timing 604, that is, NG between the first stage and the 88th stage, OK between the 89th stage and the 194th stage, and NG between the 195th stage and the stage having the largest number. In the full inspection tuning, the 141th stage as the center between the 89th stage and the 194th stage whose reception result 603 is OK is calculated as the optimal phase.

Note that in FIG. 6A, the number of stages whose reception result is NG is 94, and that number corresponds to the data transition period (data invalid period) of data. Therefore, the inspection range in the partial inspection tuning is preferably set to cover this number of stages. Here, 50 preceding stages and 50 succeeding stages are set with respect to the central stage, resulting in 101 stages in total. Contents 605 in the reception result table (small) 210 represent the result of partial phase tuning performed immediately after the full inspection tuning. Here, the reception result in the inspection range of the predetermined number of stages is inspected centered on 141 serving as the optimal number of stages. The reception result represents OK in all the stages. If the result of OK in all the stages is thus obtained in the inspection range, the optimal phase calculation unit 213 does not change the optimal number of stages, and thus 141 stages are continuously used as the optimal number of stages.

FIG. 6B is a view showing an example in which the partial phase tuning is performed in a state in which the data output timing has changed due to a temperature change in the memory card 115 after performing the full inspection tuning. In FIG. 6B, more deviations occur in a relationship between a clock waveform 606 and a data waveform 607 than in a relationship between the clock signal 601 and the data waveform 602. More specifically, the data waveform 607 is temporally delayed from the clock waveform 606. If the partial phase tuning is performed in this case, contents 608 in the reception result table (small) 210 include the number of stages showing NG. More specifically, the reception result is NG between the 91th stage and the 138th stage and OK between the 139th stage and the 161th stage. In this case, it is found that the data output timing is delayed by at least (138−91=) 47 stages. Accordingly, the new optimal number of stages can be decided again by correcting the original optimal number of stages by the deviation amount. More specifically, 188 stages are set as the new optimal number of stages by adding the deviation amount (141+47). Note that in the above-described case, correction is performed by adding the deviation amount because the data waveform 607 is temporally delayed. On the other hand, if the data waveform 607 temporally advances, correction is performed by subtracting the deviation amount.

In this embodiment, the upper-layer program can selectively use the full inspection tuning and the partial inspection tuning. If a processing load is focused in terms of the selective use, the set number of delay stages is 200 in the full inspection tuning, whereas the set number of delay stages is about 100 in the partial inspection tuning. Accordingly, in the partial inspection tuning, the number of times of issuance of a command for requiring the test data from the memory card 115 decreases almost by half. Along with this, the total time for tuning also decreases almost by half. In the upper-layer program according to this embodiment, considering this characteristic, the full inspection tuning can be performed until the recording start instruction immediately after card mounting or between a power ON instruction and the recording start instruction, and then the partial inspection tuning can be performed at an arbitrary timing. More specifically, an arrangement is possible in which the partial inspection tuning is performed, for example, immediately before card write execution during moving image recording or at the time of still image recording, or prior to the execution. In this arrangement, the partial inspection tuning having a short operation time is performed immediately before data write after calculating the accurate and optimal number of delay stages immediately after card mounting. This makes it possible to secure data write reliability while reducing an influence on card performance by the tuning time.

At the time of still image shooting, there are a single shooting mode in which a still image in one frame is shot and recorded by one shutter button operation and a continuous shooting mode in which still images in a plurality of frames are continuously shot and recorded while pressing the shutter button. In such an arrangement, it is possible, at the time of the single shooting mode, to perform the full inspection tuning for each imaging instruction based on the shutter button operation. On the other hand, at the time of the continuous shooting mode, it is possible to perform the partial inspection tuning in accordance with the imaging instruction based on the shutter button operation. At this time, the partial inspection tuning may be performed only when the first shutter is released and never be performed after that. In this arrangement, at the time of single shooting, the time interval of still image recording is not defined and it is possible to cope with the possibility of a temperature change with the elapse of time. At the time of continuous shooting, it is possible to provide a tuning system capable of meeting a card performance requirement having a shorter time interval in the still image recording.

As the operation state of the digital camera 100, there are an OFF state (operation stop state) in which the power supply of all blocks is stopped or cut off and a standby state (power saving state) in which power consumption is restricted as compared to a normal operation state though the power supply has not been stopped. In the standby state, for example, it is possible to only energize a block for detecting a button operation and shut off the power of another non-use block. In this case, an arrangement may be possible in which the full inspection tuning is performed at the time of recovery from the operation stop state, in particular, immediately after card mounting at the time of activation, and the partial inspection tuning is performed immediately after recovery from the standby state. In this arrangement, it is possible to provide a system capable of quickly shifting to a state in which card write can be performed at the time of the recovery from the standby state in which quick start-up is required specifically.

As described above, it is possible to selectively use the full inspection tuning capable of detecting the optimal number of stages from a state in which there is no information on the number of delay stages to be set in the delay element 207 in accordance with an apparatus state and the partial inspection tuning which follows a change in the optimal number of stages in a short time based on the result of the full inspection tuning. This makes it possible to maintain access reliability while preventing a card performance reduction caused by tuning.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261842, filed Dec. 18, 2013 which is hereby incorporated by reference herein in its entirety.

What is claimed is:

1. A data processing apparatus comprising:
a transmission unit configured to transmit a clock signal to a recording medium;
a communication unit configured to transmit a command to the recording medium and receive data output from the recording medium in response to a timing signal obtained by delaying the clock signal; and
a control unit configured to control said communication unit to transmit a transmission command for requesting the recording medium to transmit a predetermined data string having a predetermined pattern and receive the predetermined data string output from the recording medium, and
wherein said control unit performs an adjustment process for adjusting a delay amount of the timing signal based on a result that said communication unit has received the predetermined data string, and
said control unit has a plurality of modes including a first mode in which the delay amount of the timing signal is adjusted based on a result that said communication unit has received the predetermined data string in response to a plurality of timing signals each has a delay amount in a first range and a second mode in which the delay amount of the timing signal is adjusted based on a result that said communication unit has received the predetermined data string in response to a plurality of timing signals each has a delay amount in a second range narrower than the first range.

2. An apparatus according to claim 1, wherein said control unit decides the second range based on the delay amount determined by the adjustment process executed in the first mode.

3. An apparatus according to claim 1, wherein said control unit sets, as the second range, a period longer than a transition period of the data output from the recording medium.

4. An apparatus according to claim 1, further comprising:
an obtaining unit configured to obtain image data; and
wherein said control unit controls said communication unit to transmit a recording command of the image data and the image data to the recording medium in accordance with a recording instruction of the image data, and
said control unit performs the adjustment process in the first mode between mounting processing of the recording medium is performed and the recording instruction of the image data, and performs the adjustment process in the second mode after the adjustment process in the first mode.

5. An apparatus according to claim 4, wherein said control unit performs the adjustment process in the second mode while said obtaining unit performs a process for recording the image data.

6. An apparatus according to claim 4, wherein said control unit performs the adjustment process in the second mode before the image data is transmitted to the recording medium.

7. An apparatus according to claim 4, wherein when the image data of one frame is recorded by one operation of an operation member for the recording instruction, said control unit performs the adjustment process in the first mode in accordance with the recording instruction.

8. An apparatus according to claim 4, wherein when the plurality of recording instructions are output by one operation of an operation member for the recording instruction and the image data of the plurality of frames is recorded, said control unit performs the adjustment process in the second mode in accordance with the recording instruction.

9. An apparatus according to claim 8, wherein when the image data is recorded by, out of the plurality of recording instructions, a second or subsequent recording instruction, said control unit does not perform the adjustment process in the second mode.

10. An apparatus according to claim 1, wherein said control unit performs the adjustment process in the first mode between a power ON instruction and a recording instruction of data onto the recording medium.

11. A data processing method comprising:
transmitting a clock signal to a recording medium;
receiving data output from the recording medium in response to a timing signal obtained by delaying the clock signal;
requesting the recording medium to transmit a predetermined data string having a predetermined pattern and receiving the predetermined data string output from the recording medium, and
adjusting a delay amount of the timing signal based on a result of receiving the predetermined data string,
wherein said adjusting has a plurality of modes including a first mode in which the delay amount of the timing signal is adjusted based on a result of receiving the predetermined data string which has received in response to a plurality of timing signals each has a delay amount in a first range and a second mode in which the delay amount of the timing signal is adjusted based on a result of receiving the predetermined data string which has received in response to a plurality of timing signals each has a delay amount in a second range narrower than the first range.

* * * * *